United States Patent
Yoon

(10) Patent No.: US 7,792,228 B2
(45) Date of Patent: Sep. 7, 2010

(54) APPARATUS AND METHOD FOR DIGITAL DOWN-CONVERSION IN A MULTI-MODE WIRELESS TERMINAL

(75) Inventor: Weon-Ki Yoon, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 11/056,654

(22) Filed: Feb. 11, 2005

(65) Prior Publication Data

US 2005/0201501 A1  Sep. 15, 2005

Related U.S. Application Data

(60) Provisional application No. 60/553,273, filed on Mar. 15, 2004.

(51) Int. Cl.
*H04B 1/10* (2006.01)
(52) U.S. Cl. .................. 375/350; 375/324; 375/345
(58) Field of Classification Search .............. 375/340, 375/350, 324, 345; 455/234.1
See application file for complete search history.

(56) References Cited

U.S. PATENT DOCUMENTS

| | | | | |
|---|---|---|---|---|
| 5,416,802 A | * | 5/1995 | Ishii | 375/316 |
| 5,640,424 A | * | 6/1997 | Banavong et al. | 375/316 |
| 6,282,184 B1 | * | 8/2001 | Lehman et al. | 370/342 |
| 2002/0163979 A1 | * | 11/2002 | Takatz et al. | 375/345 |
| 2003/0053558 A1 | * | 3/2003 | Unger et al. | 375/316 |
| 2003/0157912 A1 | * | 8/2003 | Atkinson et al. | 455/234.1 |
| 2006/0052124 A1 | * | 3/2006 | Pottenger et al. | 455/515 |

* cited by examiner

*Primary Examiner*—Shuwang Liu
*Assistant Examiner*—Kabir A Timory

(57) ABSTRACT

A multi-mode digital down-converter for down-converting an incoming IF signal to baseband according to a selected air interface standard. The down-converter comprises a re-configurable gain control block controlled by a first gain parameter for amplifying the incoming IF signal and a mixer stage for down-converting the amplified incoming IF signal to produce a first in-phase baseband signal. The down-converter further comprises a reconfigurable CIC decimation filter block controlled by a second gain parameter and a first decimation parameter. The reconfigurable CIC decimation filter block filters the first in-phase baseband signal according to the second gain parameter and decimates the first in-phase baseband signal according to the first decimation parameter. The first and second gain parameters and the first decimation parameter are determined by the selected air interface standard.

20 Claims, 5 Drawing Sheets

| | CIC DEC | FIR1 (TAPS) | DEC | FIR2 (TAPS) | DEC | FIR3 (TAPS) | DEC | IHBF | RESAMPLER |
|---|---|---|---|---|---|---|---|---|---|
| GSM | 20 | 78 | 4 | 88 | 1 | BYPASS | | YES | YES |
| OUTPUT RATE (Mcps) | 3.44064 CHIPX12.704 | | | | 0.86016 CHIPX3.176 | | | 1.72032 CHIPX6.352 | |
| CDMA | 7 | 30 | 2 | 64 | 1 | BYPASS | | YES | BYPASS |
| OUTPUT RATE (Mcps) | 9.8304 (CHIPX8) | | 4.9152 (CHIPX4) | | 4.9152 (CHIPX4) | | | 9.8304 (CHIPX8) | |
| WCDMA | 4 | 30 | 2 | 32 | 2 | 32 | 1 | YES | YES |
| OUTPUT RATE (Mcps) | 17.2032 (CHIPX4.48) | | 8.6016 (CHIPX2.24) | | 8.6016 (CHIPX2.24) | | 8.6016 (CHIPX2.24) | 17.2032 (CHIPX4.48) | |

FIG. 5

APPARATUS AND METHOD FOR DIGITAL DOWN-CONVERSION IN A MULTI-MODE WIRELESS TERMINAL

CROSS-REFERENCE TO RELATED APPLICATIONS

The present invention is related to that disclosed in U.S. Provisional Patent Application Ser. No. 60/553,273, filed Mar. 15, 2004, entitled "Common Platform of Multi-Mode Wireless Terminal Digital Down Converter". U.S. Provisional Patent Application Ser. No. 60/553,273 is assigned to the assignee of the present application. The subject matter disclosed in U.S. Provisional Patent Application Ser. No. 60/553,273 is hereby incorporated by reference into the present disclosure as if fully set forth herein. The present invention hereby claims priority under 35 U.S.C. §119(e) to U.S. Provisional Patent Application Ser. No. 60/553,273.

TECHNICAL FIELD OF THE INVENTION

The present invention relates generally to wireless networks and, more specifically, to multi-mode digital down-converter for use in a multi-mode mobile station that communicates with wireless networks operating under different standards.

BACKGROUND OF THE INVENTION

Recent years have seen the deployment of a variety of different access standards for use in wireless networks (e.g., GSM, CDMA, WCDMA, IEEE-801.16, etc.). However, the proliferation of wireless access standards has proven to be inconvenient and challenging for the manufacturers of wireless mobile stations (or terminal), such as cell phones, PDA devices, wireless laptops, and the like. End-user expectations of a ubiquitous network cannot be met with mobile stations that support only a subset of the possible standards.

In response, wireless mobile stations are transitioning to software-defined radio (SDR) architectures to provide common hardware platforms for multiple air interface technologies. The continual improvement of semiconductor process technology has enabled an increasingly greater percentage of the signal processing functions in a mobile station to be performed by reconfigurable hardware. The reconfigurable hardware may take one of several forms, including fixed functional blocks with customizable parameters and flexible interconnects. The reconfigurable hardware may be implemented, for example, in a field-programmable gate array (FPGA).

However, such reconfigurable hardware blocks have typically been used in the modem portion of the mobile station. The down-converter portion of the receiver generally still requires the use of hardware circuits that are adapted to particular modulation schemes. Thus, some multimode mobile stations implement several down-conversion circuits in order to operate under different air interface standards.

Therefore, there is a need in the art for an improved software-defined radio (SDR) mobile station capable of operating under different air interface standards. In particular, there is a need for an improved SDR mobile station that implements a reconfigurable multi-mode digital down-converter.

SUMMARY OF THE INVENTION

The present invention provides a multi-mode digital down-converter for use in a mobile station (or wireless terminal) capable of communicating in diverse wireless networks operating under different air interface standards (e.g., CDMA, WCDMA, GSM, etc.).

To address the above-discussed deficiencies of the prior art, it is a primary object of the present invention to provide a multi-mode digital down-converter for down-converting an incoming intermediate frequency (IF) signal to baseband level according to a selected one of a plurality of air interface standards. According to an advantageous embodiment of the present invention, the multi-mode digital down-converter comprises a re-configurable gain control block controlled by a first gain parameter capable of amplifying the incoming IF signal and a mixer stage capable of receiving and down-converting the amplified incoming IF signal to produce a first in-phase (I) baseband signal. The mixer stage receives a first reference signal from a programmable oscillator. The digital down-converter further comprises a reconfigurable cascaded integrator/comb (CIC) decimation filter block controlled by a second gain parameter and a first decimation parameter. The reconfigurable CIC decimation filter block is capable of filtering the first in-phase baseband signal according to the second gain parameter and decimating the first in-phase baseband signal according to the first decimation parameter to produce a first filtered in-phase baseband signal. The first and second gain parameters and the first decimation parameter are determined by the selected air interface standard and wherein the programmable oscillator is programmed according to the selected air interface standard.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 5 illustrates configuration parameter for the multi-mode digital down-converter for GSM, CDMA, and WCDMA air interface standards according to exemplary embodiments of the present invention.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

Figure 1:
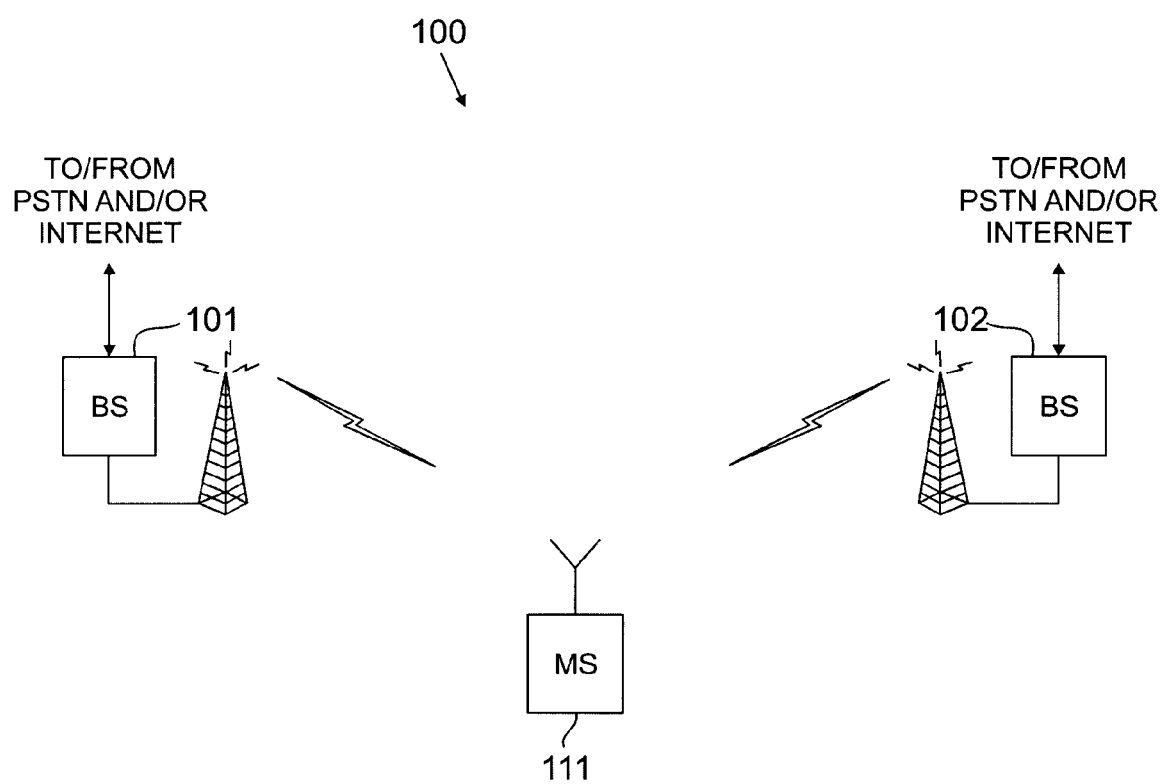
FIG. 1 illustrates a communication system in which a multi-mode mobile station (or wireless terminal) may communicate with base stations operating under different air interface standards.

FIG. 1 illustrates wireless communication system 100, in which multi-mode mobile station (or wireless terminal) 111 may communicate with base stations operating under different air interface standards. In FIG. 1, it is assumed that base station 101 is part of a first wireless network operating according to a first air interface standard (e.g., CDMA2000 in this example). It is further assumed that base station 102 is part of a second wireless network operating according to a second air interface standard (e.g., GSM in this example). Mobile station (MS) 111 may be configured by a first software load to communicate with BS 101 and may be re-configured by a second software load to communicate with BS 102. The software loads may be selected manually by user inputs or automatically by the detection of signals from BS 101 and BS 102.

The present invention is not limited to use with truly mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Figure 2:
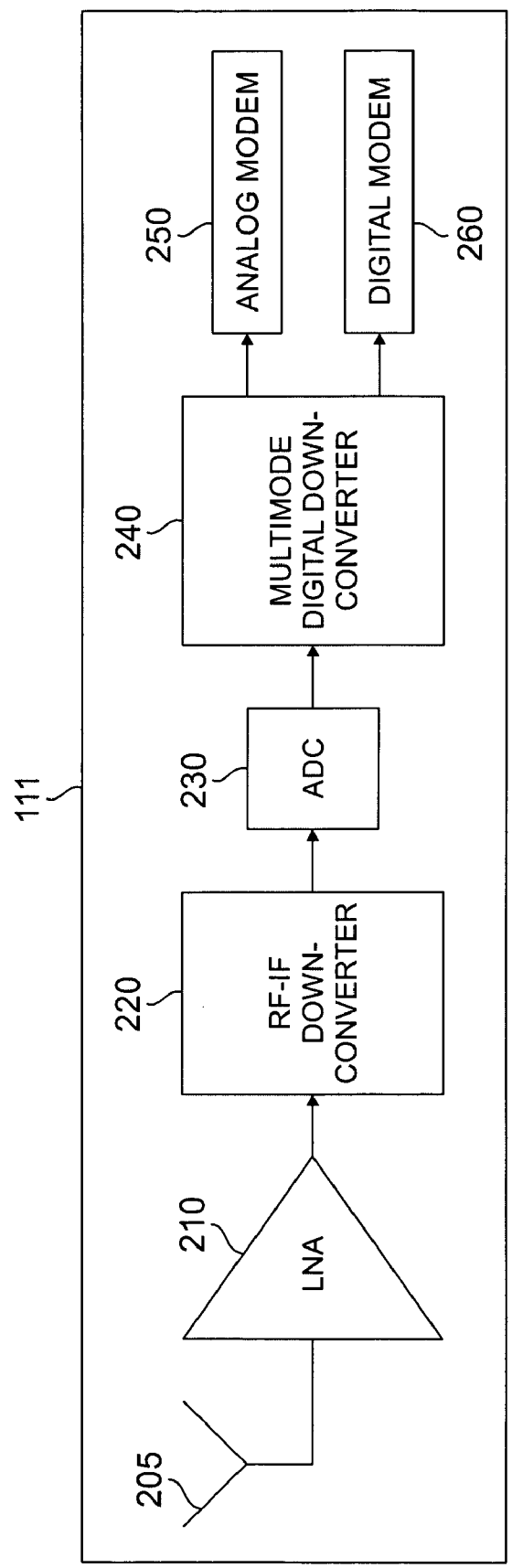
FIG. 2 is a high-level block diagram illustrating a multi-mode mobile station according to an exemplary embodiment of the present invention.

FIG. 2 is a high-level block diagram illustrating multi-mode mobile station (MS) 111 according to an exemplary embodiment of the present invention. MS 111 comprises antenna 205, low-noise amplifier (LNA) 210, radio frequency-intermediate frequency (RF-IF) down-converter 220, analog-to-digital converter (ADC) 230, multi-mode digital down-converter 240, analog modem 250 and digital modem 260. Antenna 205, LNA 210, RF-IF down-converter 220, and modems 250 and 260 are conventional circuits. In the exemplary embodiment, modems 250 and 260 may be implemented as software-defined radio (SDR) components. The present invention is implemented in multi-mode digital down-converter 240.

LNA 210 amplifies the incoming radio-frequency (RF) signal received by antenna 250. RF-IF down-converter 220 then down-converts the amplified RF signal to an analog intermediate-frequency (IF) signal. ADC 230 converts the analog IF signal produced by RF-IF down-converter 230 to a stream of digital samples. Multi-mode digital down-converter 240 receives and demodulates the digital sample stream from ADC 230 to produce baseband frequency output in accordance with the principles of the present invention.

According the exemplary embodiment, multi-mode digital down-converter 240 is a re-configurable device that can be reprogrammed to operate under different modulation-demodulation schemes (i.e., BPSK, QPSK, 16QAM, etc.). Multi-mode digital down-converter 240 produces an analog baseband signal that is applied to the input of analog modem 250 and produces a digital baseband signal that is applied to the input of digital modem 260.

Figure 3:
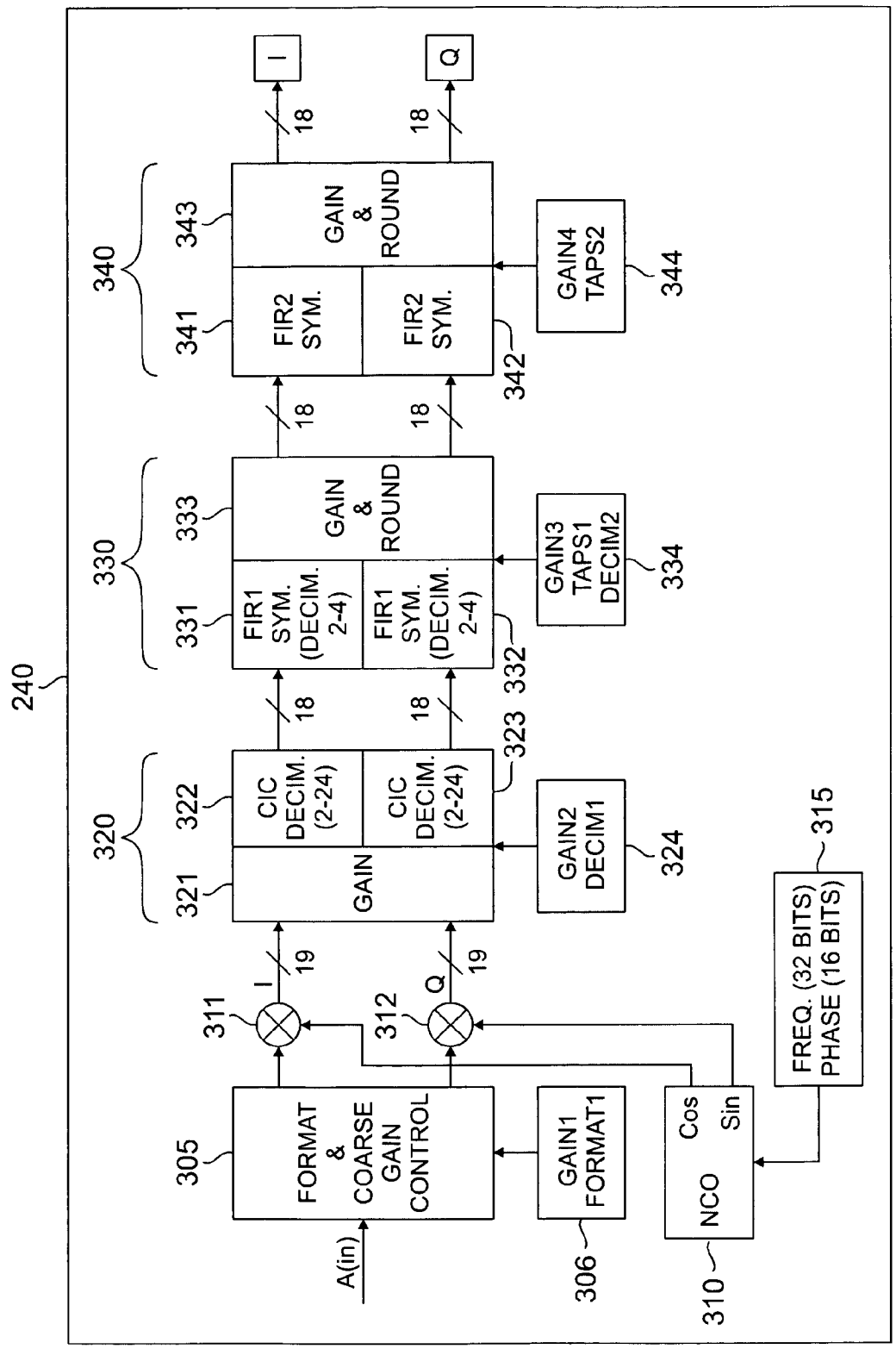
FIGS. 3 and 4 illustrate in greater detail the multi-mode digital down-converter in the multi-mode mobile station in FIG. 1 according to an exemplary embodiment of the present invention.
Figure 4:
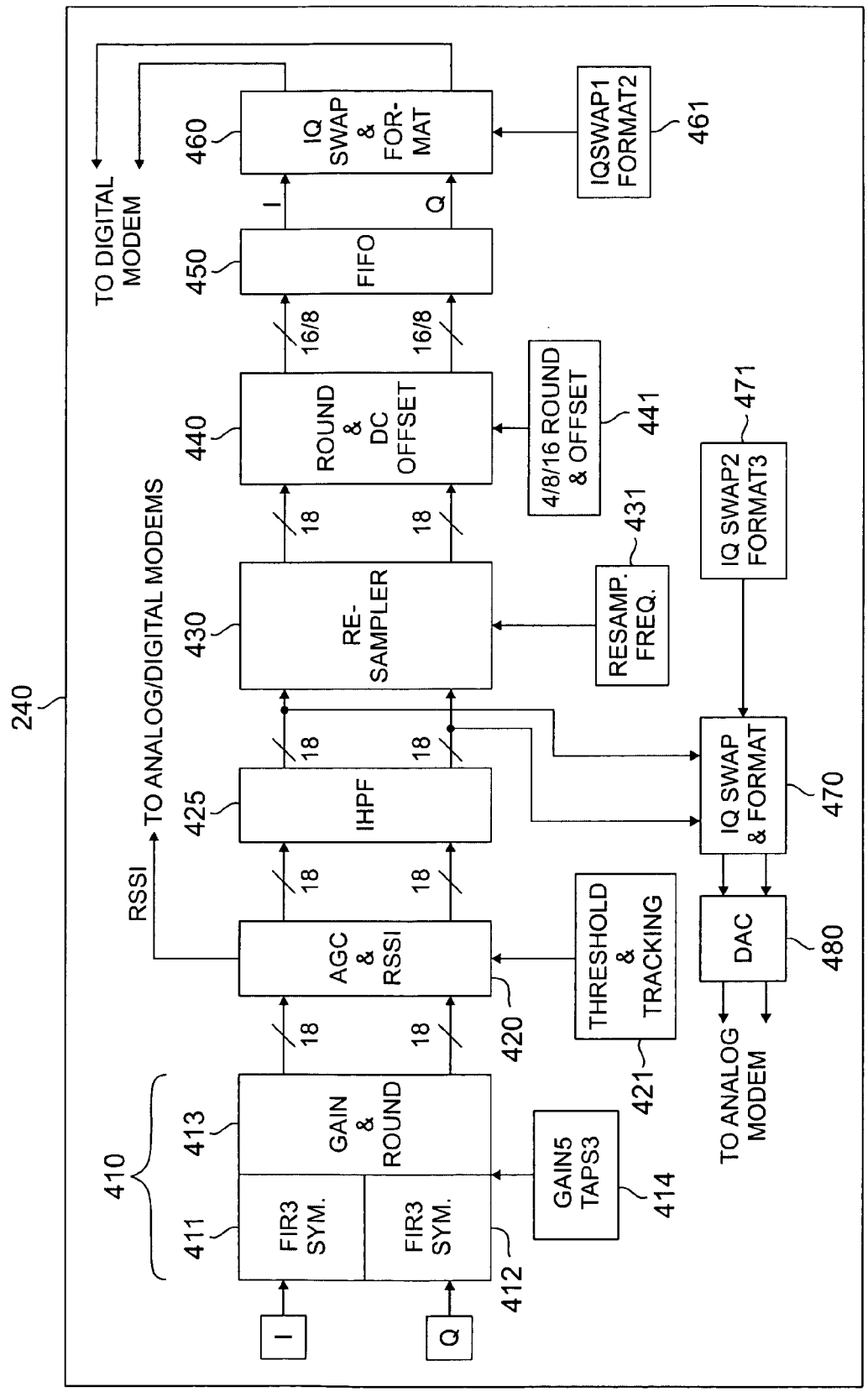

FIGS. 3 and 4 illustrate multi-mode digital down-converter 240 in multi-mode mobile station 111 in greater detail according to an exemplary embodiment of the present invention. Multi-mode digital down-converter 240 comprises a number of re-configurable (or re-programmable) functional blocks that are controlled and re-programmed by parameters (or variables) stored in a number of control registers. Multi-mode digital down-converter 240 comprises reconfigurable format and coarse gain control block 305, mixers 311 and 312, reconfigurable CIC filter block 320, reconfigurable FIR1 filter block 330, and reconfigurable FIR2 filter block 340.

Reconfigurable format and coarse gain control block 305 is controlled by the GAIN1 and FORMAT1 parameters stored in control register 306. Reconfigurable CIC filter block 320 is controlled by the GAIN2 and DECIM1 parameters stored in control register 324. Reconfigurable FIR1 filter block 330 is controlled by the GAIN3, TAPS1 and DECIM2 parameters stored in control register 334. Reconfigurable FIR2 filter block 340 is controlled by the GAIN4 and TAPS2 parameters stored in control register 344. Mixers 311 and 312 receive sine and cosine reference signals from numerical controlled oscillator (NCO) 310, which is controlled by frequency parameters (e.g., 32-bit value) and/or phase parameters (e.g., 16 bit value) stored in control register 315.

Multi-mode digital down-converter 240 further comprises reconfigurable FIR3 filter block 410, reconfigurable automatic gain control and received signal strength indicator (AGC and RSSI) block 420, interpolation half-band pass filter (IHPF) 425, reconfigurable resampler 430, round and DC offset block 440, FIFO 450, IQ swap and format block 460, IQ swap and format block 470 and digital-to-analog converter (DAC) 480.

Reconfigurable FIR3 filter block 410 is controlled by the GAIN5 and TAPS3 parameters stored in control register 414. AGC and RSSI block is controlled by threshold and tracking parameters stored in control register 421. The resampling rate of reconfigurable resampler 430 is controlled by the resampling parameter(s) stored in control register 431. Round and DC offset block 440 is controlled by the round and offset parameters stored in control register 441. IQ swap and format block 460 is controlled by the IQ SWAP1 and FORMAT2 parameters stored in control register 461. IQ swap and format block 470 is controlled by the IQ SWAP2 and FORMAT3 parameters stored in control register 471.

The data width of the digital intermediate frequency (IF) signal, A(in), received from ADC 230 depends on the commercial specification for ADC 230. In an exemplary embodiment, the A(in) samples may be in the range of 12 to 16 bits. The A(in) samples are amplified by reconfigurable format and coarse gain control block 305 according to the value of the GAIN1 parameter. If the format of A(in) is offset binary, then the format of A(in) is converted to 2's compliment by reconfigurable format and coarse gain control block 305 according to the value of the FORMAT1 parameter. The GAIN1 parameter is selected according to the air interface standard (i.e., GSM, WSDMA, CDMA, IEEE-802.16, etc.) under which multi-mode mobile station 111 is operating.

Mixer 311 multiplies the amplified digital IF data from reconfigurable format and coarse gain control block 305 by the cosine reference signal from NCO 310 to produce an in-phase (I) data stream having samples that are, for example, 19 bits wide. Mixer 312 multiplies the amplified digital IF data from reconfigurable format and coarse gain control block 305 by the sine reference signal from NCO 310 to produce a quadrature (Q) data stream having samples that are, for example, 19 bits wide.

The unfiltered I and Q baseband data from mixers 311 and 312 pass through reconfigurable filter blocks 320, 330, 340, and 410 in order to remove unwanted signals and reduce data rate. Depending on the air interface standard under which mobile station 111 is operating, one or more of reconfigurable filter blocks 320, 330, 340, and 410 may be bypassed if it is not needed. A filter block may be bypassed simply by setting any gain parameter to 1 and by not filtering or decimating the data samples, so that data samples enter and leave the filter block unchanged.

Reconfigurable CIC filter block 320 comprises input gain (or shifter) stage 321 that amplifies the I and Q samples according to the value of the GAIN2 parameter. Reconfigurable filter block 320 also comprises cascaded integrator/comb (CIC) decimation filter stage 322 for the amplified I samples and CIC decimation filter stage 323 for the amplified Q samples. The CIC decimation rate is controlled by the DECIM1 parameter and is in the rate range of 2 to 24, depending on the standard. The decimated I and Q outputs of reconfigurable CIC filter block 320 may be, for example, 18 bits.

Reconfigurable FIR1 filter block 330 comprises symmetric finite impulse response (FIR1) filter stage 331 for the I samples and symmetric finite impulse response (FIR1) filter stage 332 for the Q samples. The number of filter taps of the symmetric FIR1 block is controlled by the TAPS1 parameter and the decimation rate of the symmetric FIR1 filter block is controlled by the DECIM2 parameter and is in the rate range of 2 to 4, depending on the standard. Reconfigurable filter block 330 also comprises gain and round stage 333 that amplifies and rounds off the I and Q samples from the FIR1 filter stages according to the value of the GAIN3 parameter to produce 18-bit I and Q output streams.

Reconfigurable FIR2 filter block 340 comprises symmetric finite impulse response (FIR2) filter stage 341 for the I samples and symmetric finite impulse response (FIR2) filter stage 342 for the Q samples. The number of filter taps of the symmetric FIR2 block is controlled by the TAPS2 parameter, depending on the standard. Reconfigurable filter block 340 also comprises gain and round stage 343 that amplifies and rounds off the I and Q samples from the FIR2 filter stages according to the value of the GAIN4 parameter to produce 18-bit I and Q output streams.

Reconfigurable FIR3 filter block 410 comprises symmetric finite impulse response (FIR3) filter stage 411 for the I samples and symmetric finite impulse response (FIR3) filter stage 412 for the Q samples. The number of filter taps of the symmetric FIR3 block is controlled by the TAPS3 parameter, depending on the standard. Reconfigurable filter block 410 also comprises gain and round stage 413 that amplifies and rounds off the I and Q samples from the FIR3 filter stages according to the value of the GAIN5 parameter to produce 18-bit I and Q output streams.

The FIR2 and FIR3 filter blocks are symmetric filters without decimation. For relatively wider bandwidth air interface standards, such as WCDMA, the FIR2 and FIR3 filter blocks are cascaded in order to increase bandwidth. For the relatively narrower bandwidth air interface standards, such as CDMA or GSM, the FIR3 filter block may be bypassed to reduce the power consumption of mobile station 111. All of the FIR filter blocks are symmetric in order to reduce the size of the multiplier/shifter engines (or logic cells).

AGC and RSSI block 420 applies gain control to the I and Q samples from filter block 410 and reports RSSI data to digital modem 260 or to analog modem 250. The I and Q outputs of AGC and RSSI block 420 are then filtered by IHPF 425. The filtered I and Q outputs of IHPF 425 are then directed either to analog modem 250 or to digital modem 260. Analog modem interface circuitry couples the filtered I and Q outputs of IHPF 425 to analog modem 250. If analog modem 250 is being used, IQ swap and format block 470 swaps (if necessary) and formats the digital I and Q samples prior to conversion to analog signals by DAC 480. IQ swap and format block 470 is controlled by IQ SWAP2 and FORMAT3 parameters, which determine the format (e.g., 2s-complement, offset binary, etc.) to meet the format of DAC block 480, the routing, and the swapping of I and Q that are required by the specification of analog modem 250.

Digital modem interface circuitry couples the filtered I and Q outputs of IHPF 425 to digital modem 260. If digital modem 260 is being used, reconfigurable resampler 430 resamples the I and Q data from IHPF 425 to match the data rate of digital modem 260. Round and DC offset block 440 applies additional rounding and DC offset to the resampled data to match digital modem 260. The I and Q data samples are then stored in FIFO 450. IQ swap and format block 460 reads the I and Q samples from FIFO 450 and performs swapping (if necessary) and formatting (2s-complement, offset binary, etc.) of the digital I and Q samples to match digital modem 260. The output of IQ swap and format block 460 is sent to digital modem 260.

The present invention also provides bypass options for AGC and RSSI block 420, interpolation half-band pass filter (IHPF) 425, and resampler 430, wherein the bypass options depend on the wireless modem specification. FIG. 5 illustrates configuration parameter for multi-mode digital down-converter 240 for GSM, CDMA, and WCDMA air interface standards according to exemplary embodiments of the present invention. It is noted that no particular filter architecture is required by the present invention for the reconfigurable filters used in filter blocks 320, 330, 340 and 410 and in IHPF 425. The reconfigurable CIC decimation filters in reconfigurable CIC filter block 320 and the reconfigurable FIR filters in filter blocks 330, 340 and 410 may be any conventional filters that are suitable for the required air interface standards used by mobile station 111. Similarly, IHPF 425 may be any conventional filter design that is suitable for the particular application.

Although the present invention has been described with an exemplary embodiment, various changes and modifications may be suggested to one skilled in the art. It is intended that the present invention encompass such changes and modifications as fall within the scope of the appended claims.

What is claimed is:

1. A multi-mode digital down-converter for down-converting an incoming intermediate frequency (IF) signal to baseband level according to a selected one of a plurality of air interface standards, said multi-mode digital down-converter comprising:

a reconfigurable gain control block controlled by a first gain parameter stored in a control register, the reconfigurable gain control block capable of amplifying said incoming IF signal;

a mixer stage capable of receiving and down-converting said amplified incoming IF signal to produce a first in-phase (I) baseband signal, wherein said mixer stage receives a first reference signal from a programmable oscillator; and a reconfigurable cascaded integrator/comb (CIC) decimation filter block controlled by a second gain parameter and a first decimation parameter, wherein the first decimation parameter controls a decimation rate of the CIC decimation filter block based on the selected air interface standard, wherein said reconfigurable CIC decimation filter block is capable of filtering said first in-phase baseband signal according to said second gain parameter and decimating said first in-phase baseband signal according to said first decimation parameter to produce a first filtered in-phase baseband signal, wherein said first and second gain parameters and said first decimation parameter are determined by said selected air interface standard, wherein said programmable oscillator is programmed according to said selected air interface standard, and wherein the decimation parameter of a particular CIC filter is alterable.

2. The multi-mode digital down-converter as set forth in claim 1, further comprising a first reconfigurable finite impulse response (FIR) filter block controlled by a third gain parameter, a first taps parameter and a second decimation parameter, wherein said first reconfigurable FIR filter block is capable of filtering said first filtered in-phase baseband signal according to said third gain parameter and said first taps parameter and decimating said first filtered in-phase baseband signal according to said second decimation parameter to thereby produce a second filtered in-phase baseband signal.

3. The multi-mode digital down-converter as set forth in claim 2, further comprising a second reconfigurable finite impulse response (FIR) filter block controlled by a fourth gain parameter and a second taps parameter, wherein said second reconfigurable FIR filter block is capable of filtering said second filtered in-phase baseband signal according to said fourth gain parameter and said second taps parameter to thereby produce a third filtered in-phase baseband signal.

4. The multi-mode digital down-converter as set forth in claim 3, wherein said second reconfigurable FIR filter block is capable of being bypassed such that said third filtered in-phase baseband signal is the same as said second filtered in-phase baseband signal.

5. The multi-mode digital down-converter as set forth in claim 3, further comprising a third reconfigurable finite impulse response (FIR) filter block controlled by a fifth gain parameter and a third taps parameter, wherein said third reconfigurable FIR filter block is capable of filtering said third filtered in-phase baseband signal according to said fifth gain parameter and said third taps parameter to thereby produce a fourth filtered in-phase baseband signal.

6. The multi-mode digital down-converter as set forth in claim 3, wherein said third reconfigurable FIR filter block is capable of being bypassed such that said fourth filtered in-phase baseband signal is the same as said third filtered in-phase baseband signal.

7. The multi-mode digital down-converter as set forth in claim 5, further comprising an automatic gain control block capable of amplifying said fourth filtered in-phase baseband signal to produce a gain-adjusted in-phase baseband signal.

8. The multi-mode digital down-converter as set forth in claim 7, wherein said automatic gain control block is capable of being bypassed such that said gain-adjusted in-phase baseband signal is the same as said fourth filtered in-phase baseband signal.

9. The multi-mode digital down-converter as set forth in claim 7, further comprising analog interface circuitry coupled to said automatic gain control block and capable of converting said gain-adjusted in-phase baseband signal to an analog baseband output signal capable of being applied to an analog modem.

10. The multi-mode digital down-converter as set forth in claim 7, further comprising digital interface circuitry coupled to said automatic gain control block and capable of converting said gain-adjusted in-phase baseband signal to an digital baseband output signal capable of being applied to a digital modem.

11. A multi-mode mobile station capable of accessing wireless networks operating under different air interface standards comprising:
a radio-frequency to intermediate frequency (RF-IF) down-converter capable of down-converting an incoming radio frequency (RF) signal to produce an first intermediate frequency (IF) signal according to a selected one of a plurality of air interface standards; and
a multi-mode digital down-converter for down-converting said first IF signal to baseband level according to said selected standard, said multi-mode digital down-converter comprising:
a reconfigurable gain control block controlled by a first gain parameter stored in a control register, the reconfigurable gain control block capable of amplifying said first IF signal;
a mixer stage capable of receiving and down-converting said amplified first IF signal to produce a first in-phase (I) baseband signal, wherein said mixer stage receives a first reference signal from a programmable oscillator; and
a reconfigurable cascaded integrator/comb (CIC) decimation filter block controlled by a second gain parameter and a first decimation parameter, wherein the first decimation parameter controls a decimation rate of the CIC decimation filter block based on the selected air interface standard, wherein said reconfigurable CIC decimation filter block is capable of filtering said first in-phase baseband signal according to said second gain parameter and decimating said first in-phase baseband signal according to said first decimation parameter to produce a first filtered in-phase baseband signal, wherein said first and second gain parameters and said first decimation parameter are determined by said selected air interface standard, wherein said programmable oscillator is programmed according to said selected air interface standard, and wherein the decimation parameter of a particular CIC filter is alterable.

12. The multi-mode mobile station as set forth in claim 11, further comprising a first reconfigurable finite impulse response (FIR) filter block controlled by a third gain parameter, a first taps parameter and a second decimation parameter, wherein said first reconfigurable FIR filter block is capable of filtering said first filtered in-phase baseband signal according to said third gain parameter and said first taps parameter and decimating said first filtered in-phase baseband signal according to said second decimation parameter to thereby produce a second filtered in-phase baseband signal.

13. The multi-mode mobile station as set forth in claim 12, further comprising a second reconfigurable finite impulse response (FIR) filter block controlled by a fourth gain parameter and a second taps parameter, wherein said second reconfigurable FIR filter block is capable of filtering said second filtered in-phase baseband signal according to said fourth gain parameter and said second taps parameter to thereby produce a third filtered in-phase baseband signal.

14. The multi-mode mobile station as set forth in claim 13, wherein said second reconfigurable FIR filter block is capable of being bypassed such that said third filtered in-phase baseband signal is the same as said second filtered in-phase baseband signal.

15. The multi-mode mobile station as set forth in claim 13, further comprising a third reconfigurable finite impulse response (FIR) filter block controlled by a fifth gain parameter and a third taps parameter, wherein said third reconfigurable FIR filter block is capable of filtering said third filtered in-phase baseband signal according to said fifth gain parameter and said third taps parameter to thereby produce a fourth filtered in-phase baseband signal.

16. The multi-mode mobile station as set forth in claim 13, wherein said third reconfigurable FIR filter block is capable of being bypassed such that said fourth filtered in-phase baseband signal is the same as said third filtered in-phase baseband signal.

17. The multi-mode mobile station as set forth in claim 15, further comprising an automatic gain control block capable of amplifying said fourth filtered in-phase baseband signal to produce a gain-adjusted in-phase baseband signal.

18. The multi-mode mobile station as set forth in claim 17, wherein said automatic gain control block is capable of being bypassed such that said gain-adjusted in-phase baseband signal is the same as said fourth filtered in-phase baseband signal.

19. The multi-mode mobile station as set forth in claim 17, further comprising analog interface circuitry coupled to said automatic gain control block and capable of converting said gain-adjusted in-phase baseband signal to an analog baseband output signal capable of being applied to an analog modem.

20. The multi-mode mobile station as set forth in claim 17, further comprising digital interface circuitry coupled to said automatic gain control block and capable of converting said gain-adjusted in-phase baseband signal to an digital baseband output signal capable of being applied to a digital modem.

* * * * *